United States Patent [19]

Flanik

[11] Patent Number: 5,658,004
[45] Date of Patent: Aug. 19, 1997

[54] TRAILER HITCH BALL COUPLER COVER HAVING A VEHICLE CONNECTED TETHER

[76] Inventor: Michael Flanik, 7215 Trevor La., Parma, Ohio 44129

[21] Appl. No.: 535,905

[22] Filed: Sep. 28, 1995

[51] Int. Cl.⁶ ............................................. B60D 1/60
[52] U.S. Cl. ............................................. 280/507
[58] Field of Search ........................ 280/507, 511, 280/504; 150/166

[56] References Cited

U.S. PATENT DOCUMENTS

| | | | |
|---|---|---|---|
| 2,616,717 | 11/1952 | Dunlap | 280/507 |
| 2,618,489 | 11/1952 | Bishop | 280/507 |
| 3,596,926 | 8/1971 | Randall | 280/507 |
| 4,738,293 | 4/1988 | Ostrom et al. | 280/507 X |
| 4,955,968 | 9/1990 | Beckerer, Jr. | 280/507 |
| 5,037,122 | 8/1991 | Beckerer, Jr. | 280/507 |
| 5,407,219 | 4/1995 | Chiu | 280/507 X |

FOREIGN PATENT DOCUMENTS

| | | | |
|---|---|---|---|
| 2 097 306 | 3/1972 | France | 280/507 |
| 2 426 583 | 1/1980 | France | 280/507 |
| 2 176 759 | 1/1987 | United Kingdom | 280/507 |

*Primary Examiner*—Kevin Hurley
*Attorney, Agent, or Firm*—Vytas R. Matas

[57] ABSTRACT

A ball type trailer hitch cover assembly has an elastic tubular ball cover section comprising a tight fitting bottom section which expands over the ball and leads it to an enlarged circumferential section loosely holding the ball therein by contracting back the bottom section. A top section is similar in size to the bottom section and has a tether attached thereto which is fastened by means of either an adhesive end surface, a fastener, or by tieing around some surface of to either the hauling vehicle or even the trailer to prevent the inadvertent loss of the ball cover when the cover is removed during hauling.

15 Claims, 7 Drawing Sheets

TRAILER HITCH BALL COUPLER COVER HAVING A VEHICLE CONNECTED TETHER

BACKGROUND OF THE INVENTION

1. Field of Invention

The present invention is drawn generally to trailer coupler covers and more particularly to such covers having retaining means connected thereto tethered to a vehicle surface.

2. Description of the Prior Art

Trailer towing devices are known which have a ball shaped hitch at the end of a trailer tongue which couples with a mating ball coupling affixed to the vehicle used to tow the trailer.

When the trailer is not being towed, a cover is generally used to cover the ball shaped hitch keeping it safe from the elements which may corrode and pit the ball surface shortening its life and making it difficult to couple the ball to the vehicle mounted ball coupler. Also, since the ball and the vehicle coupler are usually greased to provide a rotatable coupling facilitating the turning of the trailer, the cover prevents the grease from contacting and soiling the clothes of people coming in contact with the trailer.

Usually when this ball cover is removed from the ball hitch prior to connecting the hitch to the vehicle it is thrown either into the trailer or the towing vehicle trunk or back seat. In addition to the possibility of easily losing the cover, usually this loss does not occur until the grease on the cover dirties up the vehicle or trailer interior.

Thus what was needed was a trailer ball hitch cover which would be retained in the trailer or vehicle vicinity out of harms way when it was removed from the trailer ball.

SUMMARY OF THE INVENTION

The present invention solves the problems associated with prior art ball hitch covers as well as others by providing a tubular cup shaped ball cover having a tether connected to the top thereof terminating in an attachment means for retaining the tether and consequently the cover attached thereto connected to either the hauling vehicle or to the trailer.

The tubular cup shaped ball cover is formed of injection molded slightly elastic rubber or plastic material to have an enlarged circumferential ring portion approximately halfway up the tubular portion to provide an area pressing on the maximum circumferential area of the ball hitch with the lower remaining section of the ball hitch being covered by bottom open end of the tubular section and the upper section of the ball hitch being covered by the upper closed end of the tubular section. Thus the entire ball hitch is covered by pushing the lower cylindrical portion over the ball hitch to have it expand slightly until the ball is moved to the enlarged circumferential portion halfway up the cylinder.

The tether is made of rubber or rope cord or a light chain which has a cover end connected to the closed end of the cylindrical ball cover. The connection may be made by passing the cover end of the tether through an opening in the closed cover end and either tieing it into a knot or fastening some retainer on the end such as a split washer or a crimped ring which will form a cover end on the tether larger than the opening through which the tether was first passed to prevent the tether from being pulled out of the cover end. Of course, the ball cover and tether could be formed as a single unit in the injection molding process. The other end of the tether has means formed thereon for retaining the tether to either the hauling vehicle or the trailer. One such means would include an eyelet crimped on the end of the tether which would then be used to retain a screw fastener mounted to an appropriate area of the trailer or the vehicle. The license plate is one location.

Other means include a suction cup or an adhesive covered surface as well as a retainer clip which would fasten the tether as a loop around some surface of the trailer or vehicle.

In view of the foregoing it will be seen that one aspect of the present invention is to provide a tethered cover for a ball trailer hitch that will retain the cover attached to the trailer or hauling vehicle when it is removed from the ball hitch.

Another aspect of the present invention is to provide an elastic ball hitch cover that has an expanded area half way along the cover and an open end that expands to slip over the ball and contracts there after to retain the ball within the expanded area of the cover.

Yet another aspect of the present invention is to provide a tethered ball hitch cover having an end section attached to the tether which adheres to a surface of either the trailer or vehicle.

These and other aspects of the present invention will be more fully understood after consideration of the following description of the preferred embodiment when considered in conjunction with the accompanying drawings.

DESCRIPTION OF THE PREFERRED EMBODIMENT

Figure 1:
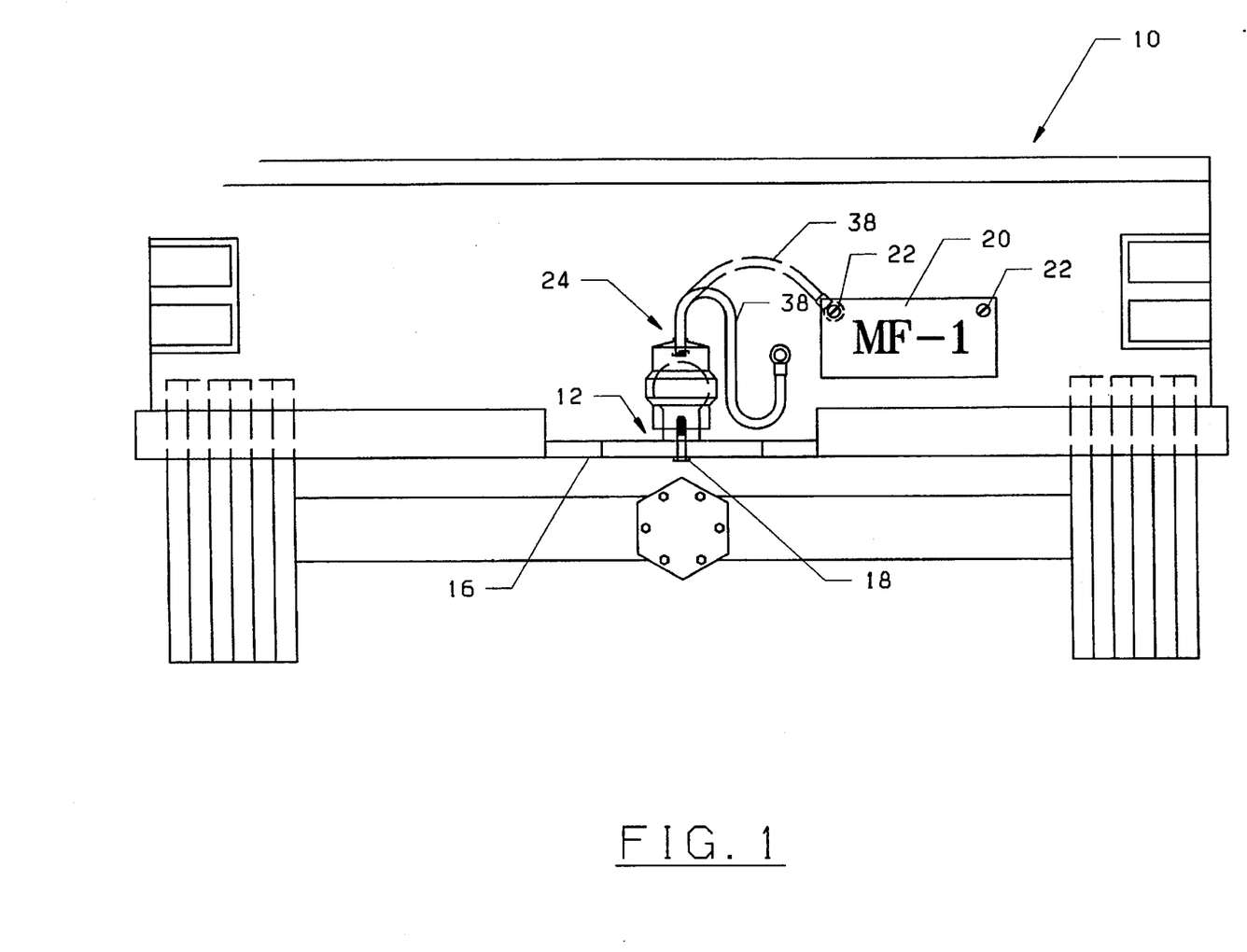
FIG. 1 is a front view of a trailer having a ball hitch with a tethered ball cover of the present invention.
Figure 2:
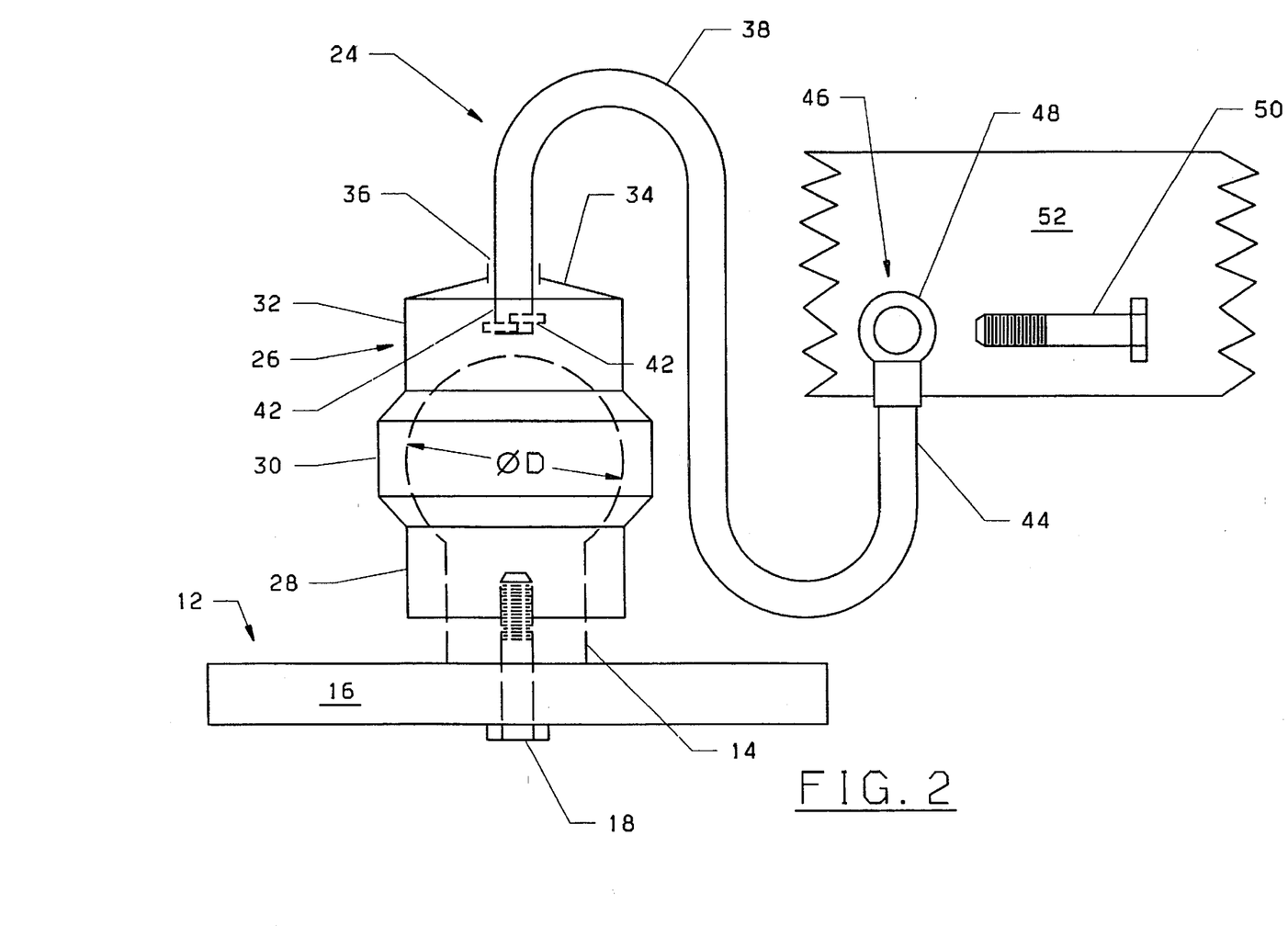
FIG. 2 is an expanded view of the ball hitch tethered cover as shown in FIG. 1.
Figure 3:
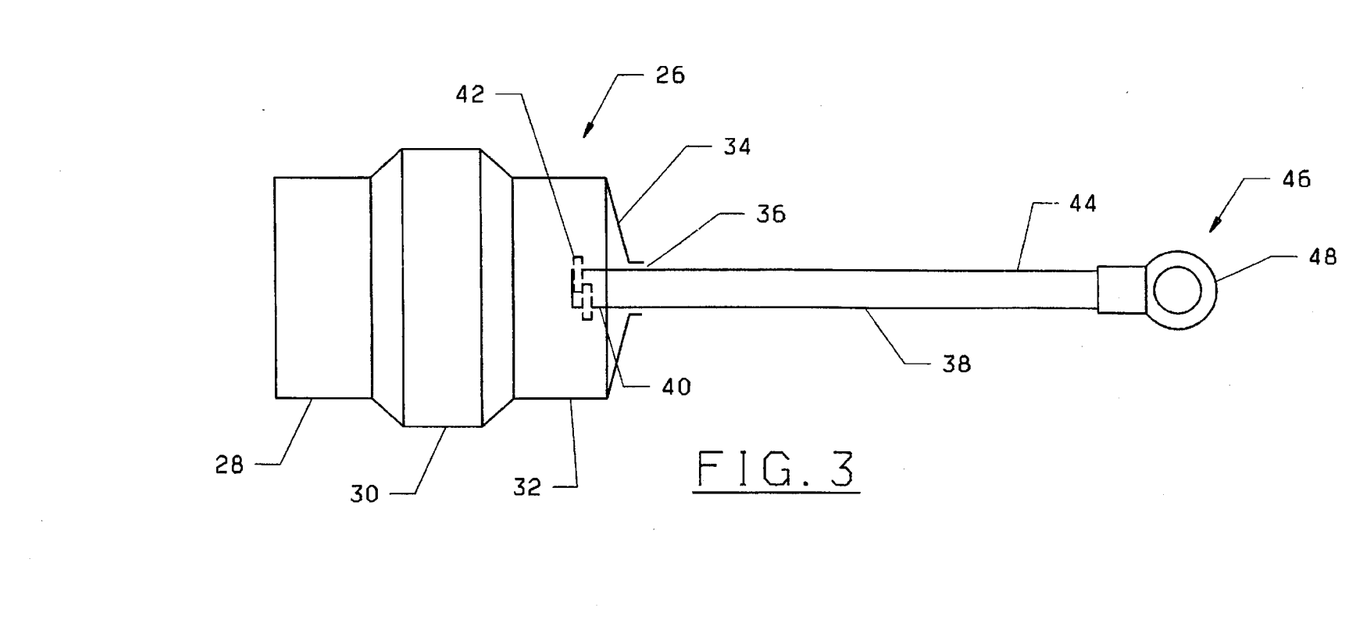
FIG. 3 is an enlarged view of the ball hitch tethered cover of the present invention showing one type of tether to cover connection.

Referring to the drawings generally and FIGS. 1–3 in particular it will be seen that a known wheeled trailer (10)

has a ball type hitch assembly (12) formed by a ball post (14) mounted to a trailer hitch (16) by a bolt (18). The hitch (16) is usually formed as an extended beam (17) from the trailer (10) with the ball located near the end thereof. When the trailer is being hauled, a known mating assembly (not shown) is connected to the rear of the hauling vehicle (not shown) which engages the ball and hauls it thereby. A license plate (20) is usually located on the hauling vehicle rear the ball (14) which is retained to the vehicle by bolts(22).

When the trailer (10) is disconnected from the vehicle, a tethered ball cover assembly (24) is used to cover the ball (14).

The assembly (24) has a cup shaped tubular member (26) having a bottom section (28) which is approximately the diameter D of the ball (14) or slightly smaller. Approximately halfway up the tubular member (26) is an enlarged area (30) that loosely conforms to the circular or spherical shape of the ball (14) leading to a top section (32) having a cover (34) formed thereover with an aperture (36) located thereon. The tubular member (26) is formed from a slightly elastic injection molded rubber or plastic material which allows the bottom portion (28) to expand as it is pushed onto the ball (14) until the ball (14) fits into the enlarged area (30) at which time the lower section (28) retracts to keep the ball (14) captured within the loose fitting enlarged area (30).

A tether (38) has a cup end (40) extended into the top section (32) of the assembly (26) through the opening (36) in the cover (34). This end (40) is captured therein by pressing a split washer (42) on the end (40) which is larger than the opening (36). Thus pulling the tether (38) would remove the assembly (26) from the ball (14) rather than having the tether pull out of the opening (36). The other end (44) of the tether (38) has a retaining fixture (46) fastened thereto for tying the tether (38) and the assembly (26) connected there to either the trailer or the hauling vehicle to insure that the assembly (26) is not lost when it is removed from the ball (14).

The retaining fixture (46) is an eyelet (48) which is crimped on the end of the tether (38). This eyelet (48) allows the tether to be fastened by a screw (50) to an appropriate surface (52) of the trailer (10). Alternately, as best seen in the dotted line showing of FIG. 1, the tether (38) could be connected through the eyelet (46) to the license plate (20) of the hauling vehicle (not shown) through one of the license plate bolts (22). The tether (38) could be made as a solid cord from the rubber or plastic material forming the assembly (26). Alternately, it could be made from ordinary rope, plastic tubing, or a light metal chain.

Figure 3A:
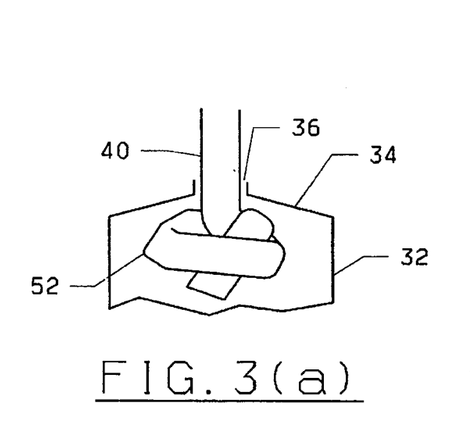
FIG. 3(a) is an enlarged view of an alternate connection of tether to cover from that shown in FIG. 3.
Figure 3B:
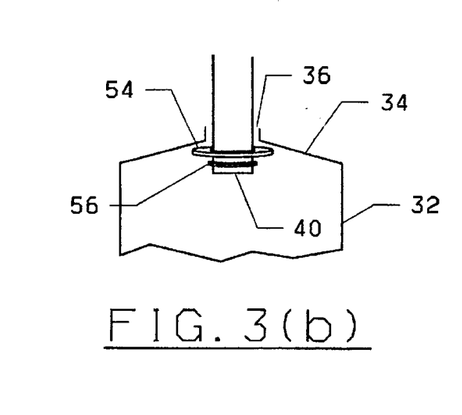
FIG. 3(b) is an enlarged view of yet another alternate connection of tether to cover from that shown in FIG. 3 or FIG. 3(a).

In any event, the tether (38) could be captured in the assembly (36) upper surface (32) by alternate arrangements shown in FIGS. 3(a) and 3(b). In FIG. 3(a) the end (40) of the tether (38) is tied into a knot (52) larger than the opening (36) while in FIG. 3(b) an enlarged washer (54) larger than the hole (36) is slipped onto the end (40) and kept there by crimping a metal band (56) on the end below the washer (54).

Figure 4:
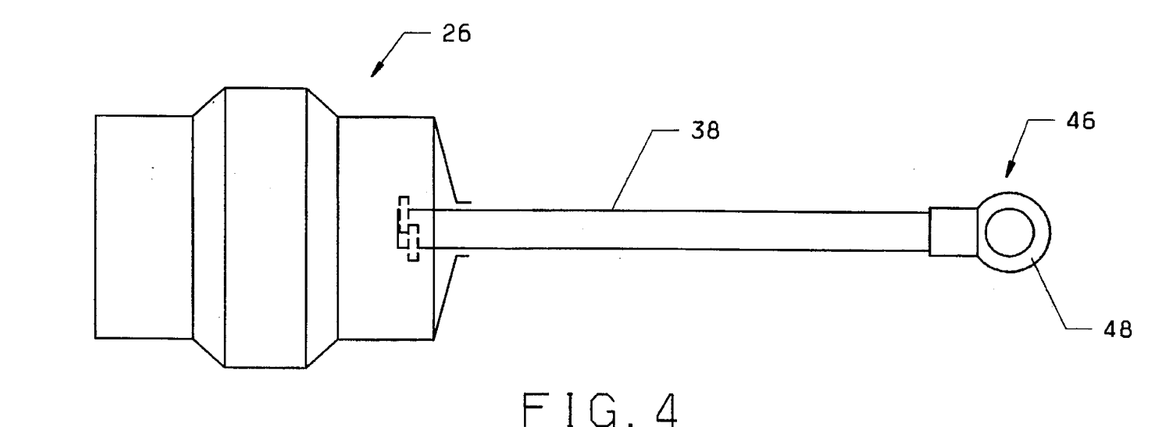
FIG. 4 is an enlarged view of the tethered ball cover of the present invention shown molded as a single piece.

While the foregoing construction has depicted a multi piece assembly (24), it will be understood that if the sales volume justifies expenditures for complex tooling the entire assembly (24) could be formed as one piece from injected molded elastic plastic or rubber as seen in FIG. 4.

Figure 5:
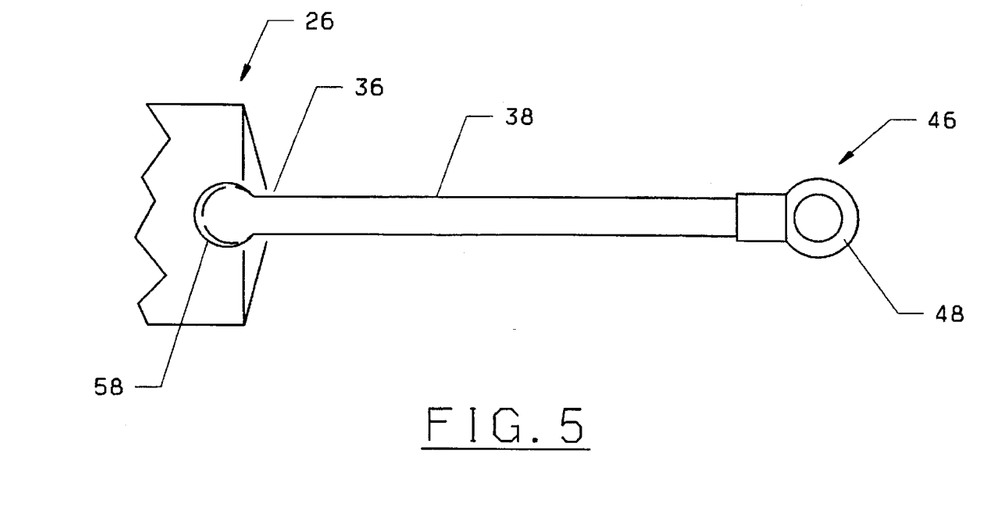
FIG. 5 is an alternate two piece construction for the tethered ball cover shown in FIG. 4.

A totally molded two piece construction is also possible as shown in FIGS. 5–8. FIG. 5 shows the assembly (26) molded as one piece while the tether (38) is molded as a second piece. The retainer (46) being flexible can be bent in half and the eyelet (48) slipped through the opening (36) and the tether (38) pulled out until an enlarged sphere(58) significantly larger than opening (36) formed on the opposite end of the eyelet (48) is pressed against the opening (36).

Figure 6:
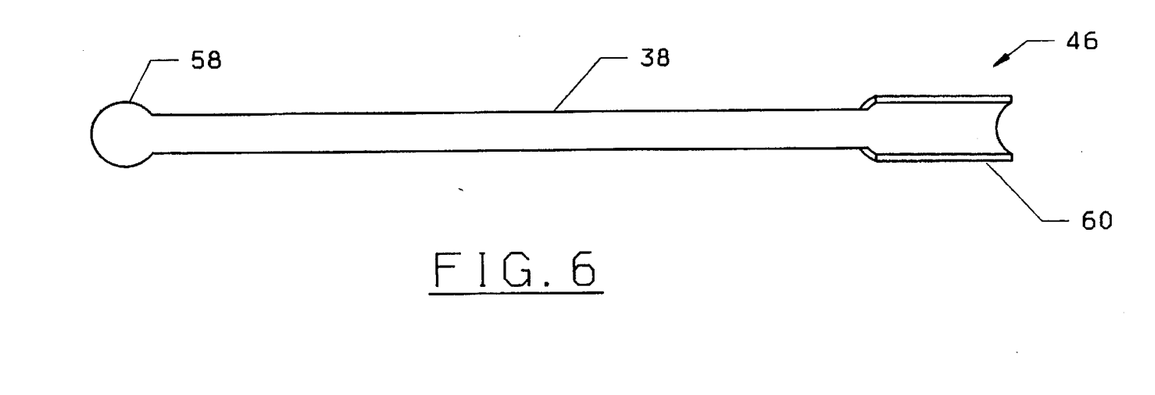
FIG. 6 is an alternate construction for the tether of the two piece construction shown in FIG. 5.
Figure 6A:
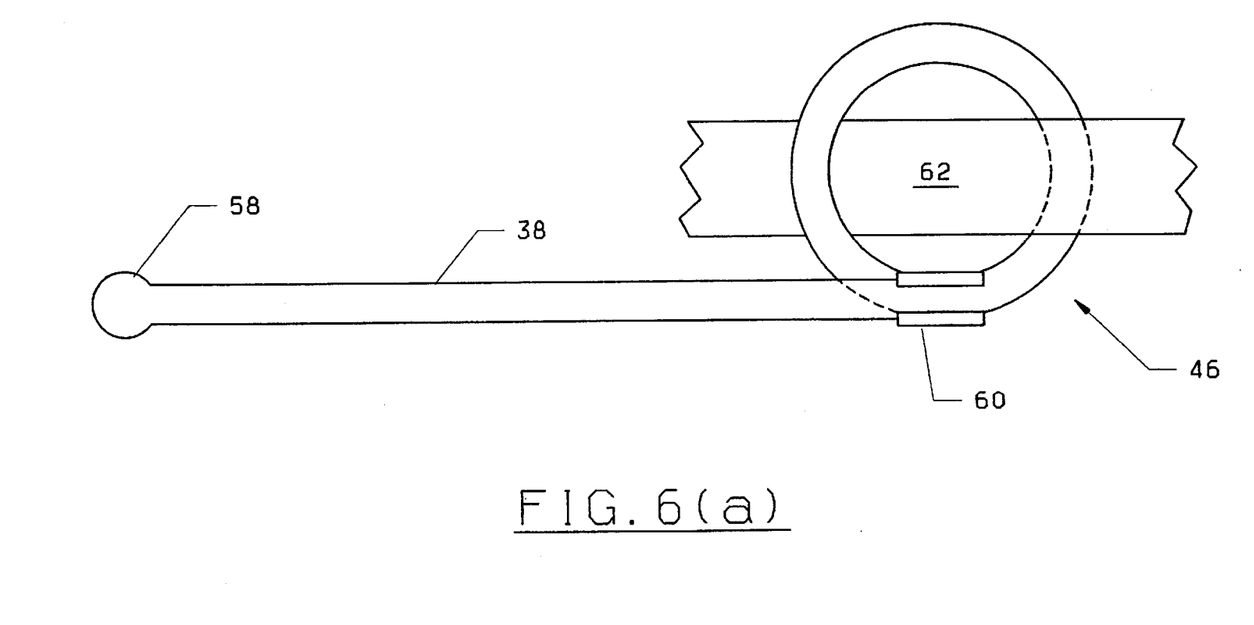
FIG. 6(a) is a showing of the FIG. 6 construction of the tether formed as a loop around some structure of the trailer or hauling vehicle.

FIG. 6 shows an alternate retainer (46) to the eyelet (48) of FIG. 5. Here, a flexible cut away tubular member (60) is formed on the retaining end of the tether (38). The tubular member (60) has an internal diameter conforming to the diameter of the tether (38) and thus allows the tether (38) to be looped around any tubular or other open section (62) of the trailer (10) or the hauling vehicle and captured to itself by pressing the tether (38) into the tubular member (60). The loop can now be pulled tight around the section (62) to firmly capture the cup assembly (26) thereto.

Figure 7:
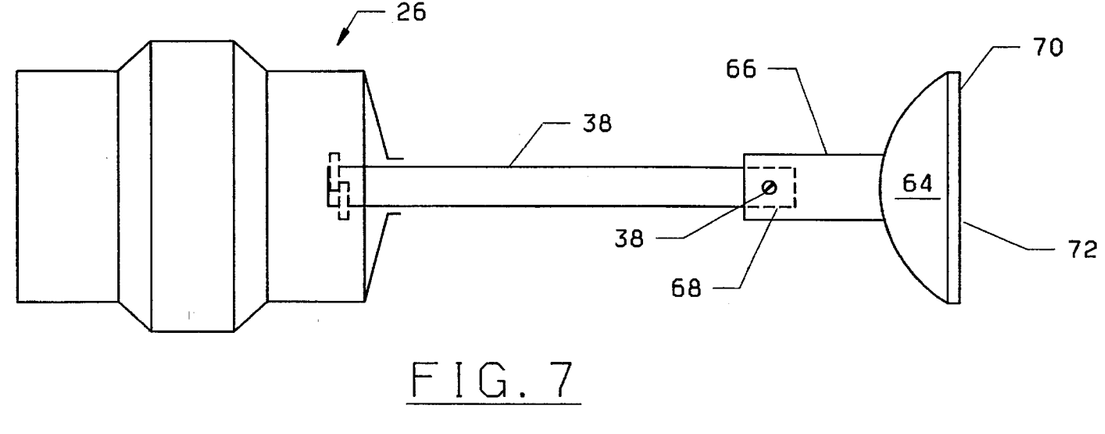
FIG. 7 is a showing of an adhesive tip connected to the tether of the tethered ball hitch cover of the present invention.
Figure 7A:
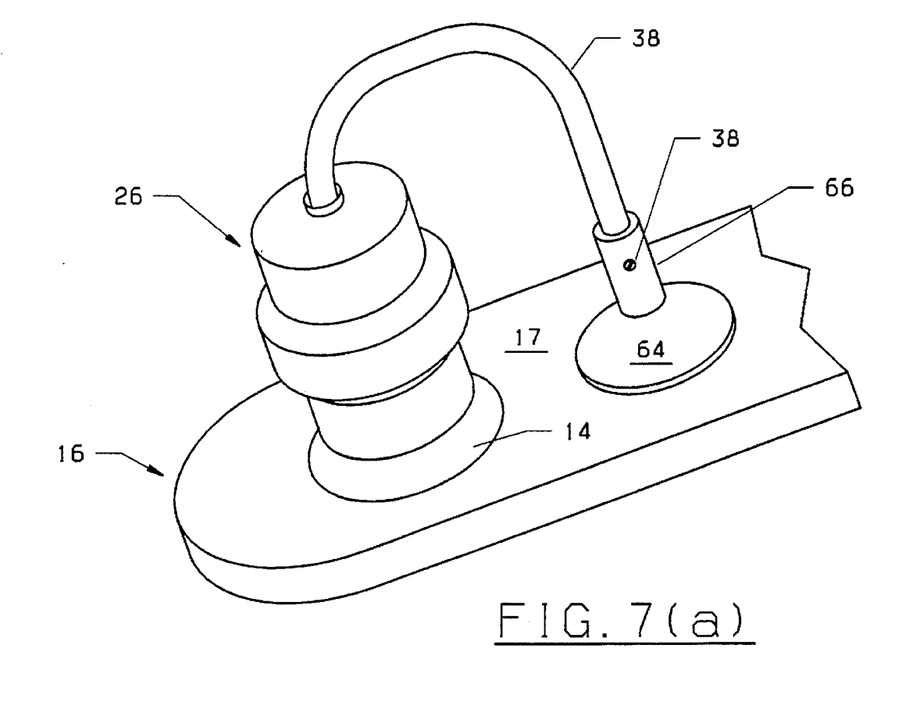
FIG. 7(a) shows the FIG. 7 cover having the adhesive tip glued to the extended beam of the ball trailer hitch with the cover covering the ball.
Figure 7B:
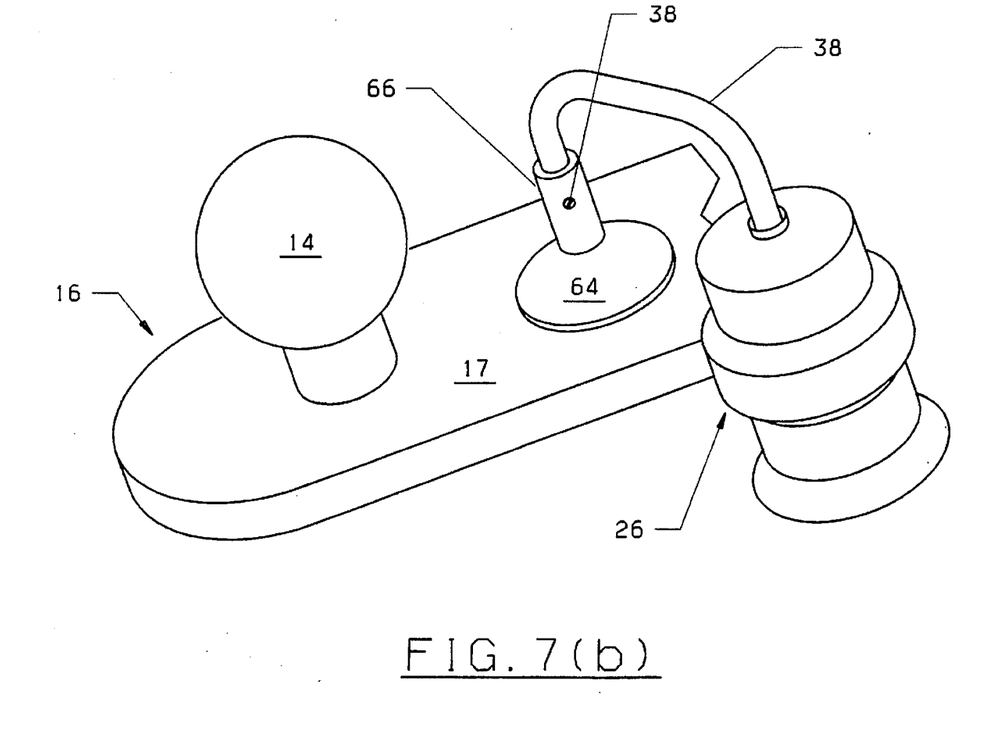
FIG. 7(b) shows the FIG. 7 cover removed from the ball but retained to the extended beam.
Figure 8:
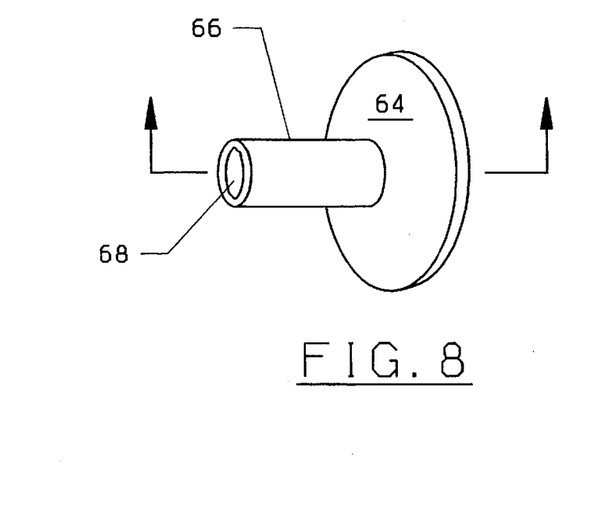
FIG. 8 is an isometric view of an alternate suction adhesive tip to the FIG. 7 embodiment.
Figure 8A:
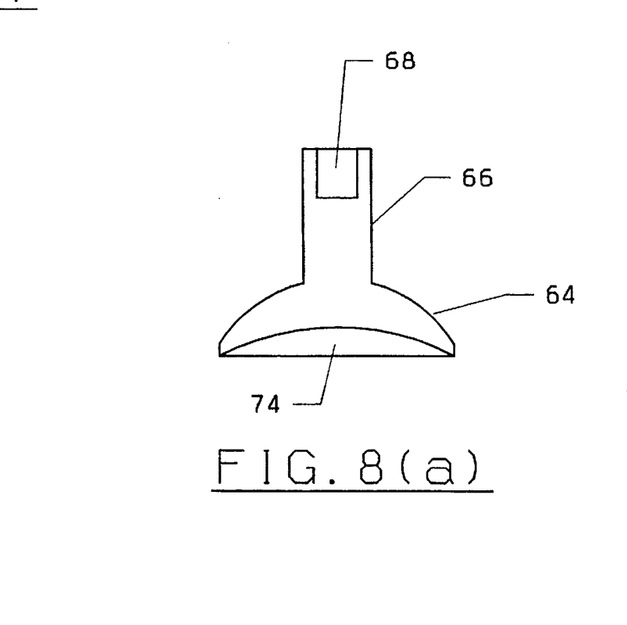
FIG. 8(a) is a cut-away section along A—A of the FIG. 8 embodiment.

As seen in FIGS. 7–8, the retaining end (46) of the tether (38) could be formed to have an adhesive member which would adhere to any surface of the trailer (10) or hauling vehicle. FIG. 7 shows a circular disk (64) having a neck portion (66) into which the tether (38) is attached by a non-corrosive screw (37). The tether (38) could also be stapled to the neck portion (66) or pressed or glued into an opening (68) therein. The outside surface (70) of the disk (64) has an adhesive coating covered with removable plastic or paper sheeting (72). To affix the tether (38) to any desired surface of the trailer (10) or hauling vehicle, one removes the sheeting (72) and presses the cup (64) to that surface capturing the assembly (26) to that surface through the tether (38. FIGS. 7(a) and 7(b) show the tether (38) connected to the extended beam (17) of the hitch (16) with the disc (64) glued thereto directly behind the ball(14). the cover assembly (26) is then easily slipped on and off the ball (14) as seen in FIGS. 7(a) and 7(b) respectively. FIG. 8 shows the cup(64) could alternately be formed as a suction cup (74) rather than an adhesive surface to provide the same adhering function.

It will be understood that certain modifications and additions have been deleted herein for the sake of conciseness and readability but are intended to fall within the scope of the following claims. As an example, the FIGS. 6 through 8 embodiments of the various retainers (46) could be formed as a single unit with the assembly (26) and the tether (38). It is intended that all such modifications and additions be included in the scope of the following claims.

What is claimed is:

1. A cover for a ball type trailer hitch comprising:

a ball cover assembly having an open ended tubular section for fitting over the ball of the trailer hitch and a covered opposite end;

a tether connected to the opposite end of the ball cover assembly at one end;

means for mounting said tether to a surface proximate to the ball type trailer hitch to thereby capture said ball cover assembly to that surface preventing the inadvertent loss of said cover assembly when removed from the ball of the trailer hitch;

said ball cover assembly having an enlarged circumferential area between the open ended tubular section and the covered opposite end thereof for capturing the ball of the ball type trailer hitch therein;

said tether being tubular and said mounting means includes an open tubular section formed on the other end of said tether having an internal diameter approximate to the external diameter of said tether allowing said tether to loop around an object and lock the loop by pressing said open tubular section on said tubular tether; and wherein the covered opposite end of said ball cover assembly has an opening therein larger than said tubular tether and said one end of said tether has an enlarged spherical section formed thereon larger than said opening allowing said open tubular section to be compressed into itself to pass through the opening and pull said tether there through until said spherical section rests against said opening.

2. A cover for a ball type trailer hitch comprising:

a ball cover assembly having an open ended tubular section for fitting over the ball of the trailer hitch and a covered opposite end;

a tether connected to the opposite end of the ball cover assembly at one end;

means for mounting said tether to a surface proximate to the ball type trailer hitch to thereby capture said ball cover assembly to that surface preventing the inadvertent loss of said cover assembly when removed from the ball of the trailer hitch;

said ball cover assembly having an enlarged circumferential area between the open ended tubular section and the covered opposite end thereof for capturing the ball of the ball type trailer hitch therein; and Wherein said mounting means includes an enlarged adhesive surface for adhering to an area proximate the ball hitch.

3. A cover as set forth in claim 2 wherein said enlarged adhesive surface comprises a circular disk formed on said other end of said tether having an adhesive coating covered with a removable cover to activate the adhesion of said disk to a surface proximate to the ball hitch.

4. A cover as set forth in claim 2 wherein said enlarged adhesive surface comprises a circular disk formed on said other end of said tether as a suction cup to adhere to a surface proximate to the ball hitch.

5. A cover as set forth in claim 2 wherein said tether is formed from a tubular plastic material and is connected to said ball cover assembly by a knot formed at an end thereof extending through the covered end of said assembly.

6. A cover for a ball type trailer hitch comprising:

a ball cover assembly having an open ended tubular section for fitting over the ball of the trailer hitch and a covered opposite end;

a tether connected to the opposite end of the ball cover assembly at one end;

means for mounting said tether to a surface proximate to the ball type trailer hitch to thereby capture said ball cover assembly to that surface preventing the inadvertent loss of said cover assembly when removed from the ball of the trailer hitch;

said ball cover assembly having an enlarged circumferential area between the open ended tubular section and the covered opposite end thereof for capturing the ball of the ball type trailer hitch therein; and Wherein said tether is formed from a tubular plastic material and is connected to said ball cover assembly by a knot formed at an end thereof extending through the covered end of said assembly.

7. A cover as set forth in claim 6 wherein said tether is formed from a tubular plastic material and is connected to said ball cover assembly by a washer formed at an end thereof extending through the covered end of said assembly.

8. A cover as set forth in claim 7 including a fastener crimped on the end of said tether below said washer.

9. A cover for a ball type trailer hitch comprising:

a ball cover assembly having an open ended tubular section for fitting over the ball of the trailer hitch and a covered opposite end;

a tether connected to the opposite end of the ball cover assembly at one end;

means for mounting said tether to a surface proximate to the ball type trailer hitch to thereby capture said ball cover assembly to that surface preventing the inadvertent loss of said cover assembly when removed from the ball of the trailer hitch;

said ball cover assembly having an enlarged circumferential area between the open ended tubular section and the covered opposite end thereof for capturing the ball of the ball type trailer hitch therein; and wherein said tether is formed from a tubular plastic material and is connected to said ball cover assembly by a washer formed at an end thereof extending through the covered end of said assembly.

10. A cover for a ball type trailer hitch mounted to a vehicle having a license plate comprising:

a ball cover assembly having an open ended tubular section for fitting over the ball of the trailer hitch and a covered opposite end;

a tether connected to the opposite end of the ball cover assembly at one end;

means for mounting said tether to a surface proximate to the ball type trailer hitch to thereby capture said ball cover assembly to that surface preventing the inadvertent loss of said cover assembly when removed from the ball of the trailer hitch;

said ball cover assembly having an enlarged circumferential area between the open ended tubular section and the covered opposite end thereof for capturing the ball of the ball type trailer hitch therein; and wherein said mounting means includes an eyelet formed on the other end of said tether with a mounting bolt extending there through into the vehicle license plate.

11. A cover as set forth in claim 6 wherein said tether is tubular and wherein said ball cover assembly, tether, and eyelet are injection molded as a single unit.

12. A cover as set forth in claim 11 wherein said single unit is formed from an elastic rubber material.

13. A cover as set forth in claim 11 wherein said single unit is formed from an elastic thermoplastic material.

14. A trailer ball hitch having a covered ball comprising;

a cover fitted over the ball of a trailer hitch;

a tether connected to said cover at one end and having a retainer end at the opposite end thereof; and means for mounting the retainer end of said tether to a surface proximate to the ball of the trailer hitch including an enlarged adhesive surface for adhering to an area proximate the ball hitch.

15. A trailer hitch as set forth in claim 14 wherein said enlarged adhesive surface comprises a circular disk formed on said other end of said tether having an adhesive coating covered with a removable cover to activate the adhesion of said disk to a surface proximate to the ball hitch.

* * * * *